United States Patent [19]

Nagano et al.

[11] Patent Number: 4,501,827

[45] Date of Patent: Feb. 26, 1985

[54] GLASS-REINFORCED POLYMER COMPOSITION COMPRISING 4-METHYL-1-PENTENE POLYMER IN COMBINATION WITH A GRAFT MODIFIED ACID POLYMER OF 4-METHYL-1-PENTENE POLYMER

[75] Inventors: Riichiro Nagano, Hiroshima; Hiroshi Kiga, Iwakuni; Tadao Iwata, Chiba, all of Japan

[73] Assignee: Mitsui Petrochemical Industries, Ltd., Tokyo, Japan

[21] Appl. No.: 564,195

[22] Filed: Dec. 22, 1983

[30] Foreign Application Priority Data

Dec. 27, 1982 [JP] Japan ................................. 57-226948

[51] Int. Cl.³ ................................................ C08K 3/40
[52] U.S. Cl. ..................................... 523/214; 524/504; 525/74; 525/78
[58] Field of Search ................ 523/213, 214; 524/504; 525/74, 78

[56] References Cited

U.S. PATENT DOCUMENTS

| | | | |
|---|---|---|---|
| 4,003,874 | 1/1977 | Ide et al. | 524/584 |
| 4,335,167 | 6/1982 | Kolditz | 524/579 |
| 4,338,228 | 7/1982 | Inoue et al. | 524/120 |
| 4,386,991 | 6/1983 | Shiomi et al. | 428/441 |

FOREIGN PATENT DOCUMENTS 48-24823  7/1973  Japan .
49-41096  11/1974  Japan .
52-31895  8/1977  Japan .

OTHER PUBLICATIONS

Derwent Abst. BE-68342 Jun. 30, 1966 Farberwerke.

*Primary Examiner*—Herbert J. Lilling
*Attorney, Agent, or Firm*—Cushman, Darby & Cushman

[57] ABSTRACT

A glass-reinforced polymer composition of the invention contains 80 to 99.99 parts by weight, of a 4-methyl-1-pentene polymer, 0.01 to 20 parts by weight of a graft-modified polymer of 4-methyl-1-pentene having graft units of an unsaturated carboxylic acid or an acid anhydride thereof in an amount of 0.5 to 15% by weight and having a limiting viscosity of 0.3 to 10 dl/g, and 1 to 300 parts by weight of glass fibers based on 100 parts by weight of the sum of the 4-methyl-1-pentene polymer and the graft-modified polymer. The composition has overall standards of mechanical strength, heat resistance and water resistance.

18 Claims, No Drawings

GLASS-REINFORCED POLYMER COMPOSITION COMPRISING 4-METHYL-1-PENTENE POLYMER IN COMBINATION WITH A GRAFT MODIFIED ACID POLYMER OF 4-METHYL-1-PENTENE POLYMER

BACKGROUND OF THE INVENTION

The present invention relates to a glass-reinforced polymer composition and, more particularly, to a fiberglass-reinforced 4-methyl-1-pentene polymer composition.

It is conventionally known to mix glass fibers in a polyolefin to improve the mechanical properties of the polyolefin such as tensile strength, flexural strength, impact strength, or to improve the heat resistance. However, satisfactory improvements in the mechanical properties or heat resistance cannot be obtained if the polyolefin is simply mixed with the glass fibers, because the bonding strength between the polyolefin and glass fibers is weak.

In view of this problem, some measures have been proposed to improve the bonding strength between the polyolefin and the glass fibers.

For example, a method is proposed in Japanese Patent Publication No. 49-41096 wherein maleic acid or maleic anhydride, a polyolefin, and glass fibers which have been surface-treated with an aminosilane compound are reacted in the presence of an organic peroxide at a temperature higher than the melting point of the polyolefin. A method is also proposed in Japanese Patent Publication No. 52-31895 wherein a polyolefin, a modified poly-α-olefin having aromatic carboxylic acid units, and glass fibers which have been surface-treated with an aminosilane compound are melt-molded at a temperature higher than the melting point of the poly-α-olefin. Furthermore, U.S. Pat. No. 4,003,874 discloses a method for preparing a composition containing a modified polyolefin, a glass reinforcing material, and a nonmodified polyolefin, the modified polyolefin being obtained by kneading a mull of a polyolefin and maleic anhydride in the presence of an organic peroxide and in a nitrogen atmosphere.

Among polyolefins a 4-methyl-1-pentene polymer has a low density is light in weight, has a relatively high transparency, and is relatively inexpensive as compared to other polyolefins. However, due to its overall standards of mechanical properties, heat resistance and water resistance being poor, the 4-methyl-1-pentene polymer has not been fully utilised. Particularly, the 4-methyl-1-pentene polymer has not been able to be used in applications where a high standard of heat resistance is required, such as home electric appliances, automobile parts and the like.

Even if the conventional techniques for improving the properties of a polyolefin as described above are applied to a 4-methyl-1-pentene polymer, a satisfactory result cannot be obtained. As noted previously, the conventional techniques as described above include a treatment at a relatively high temperature, and a 4-methyl-1-pentene polymer tends to undergo thermal decomposition at such a high temperature, unlike other polyolefins such as polyethylene or polypropylene.

SUMMARY OF THE INVENTION

It is an object of the present invention to provide a 4-methyl-1-pentene polymer composition which can be used in a variety of applications.

It is another object of the present invention to provide a 4-methyl-1-pentene polymer composition which has high overall standards of flexural strength, tensile strength, impact strength, heat resistance and water resistance.

According to an aspect of the invention, there is provided a glass-reinforced polymer composition comprising: 80 to 99.99 parts by weight of a 4-methyl-1-pentene polymer; 0.01 to 20 parts by weight of a modified graft polymer of 4-methyl-1-pentene having grafted units of an unsaturated carboxylic acid or an anhydride thereof in an amount of from 0.5% by weight to 15% by weight and a limiting viscosity falling within a range between 0.3 dl/g and 10 dl/g, inclusive; and 1 to 300 parts by weight of glass fibers with respect to 100 parts by weight of a total of the 4-methyl-1-pentene polymer and the modified 4-methyl-1-pentene polymer.

The composition of the present invention has overall improved mechanical strength, heat distortion temperature (thermal deformation temperature), and water resistance as compared to conventional compositions, and can therefore be utilized in a variety of applications. Since the composition of the present invention has a particularly high heat resistance, it can be used for home electric appliances and automobile parts which require a high standard of heat resistance, such as a connector, a tuner, a switch, a heater duct, a radiator fan.

DETAILED DESCRIPTION OF THE PREFERRED EMBODIMENTS

As has been described earlier, the composition of the present invention contains three indispensable constituents, i.e., a 4-methyl-1-pentene polymer (component A), a modified polymer of 4-methyl-1-pentene (component B), and glass fibers (component C).

COMPONENT A

A 4-methyl-1-pentene polymer (component A) includes homopolymers and copolymers of 4-methyl-1-pentene. If a copolymer is used, a copolymer of 4-methyl-1-pentence with an α-olefin having 2 to 20 carbon atoms is preferably used. This copolymer generally has an α-olefin content of up to 15 mol% and preferably up to 9 mol%. Examples of α-olefins having 2 to 20 carbon atoms include ethylene, propylene, 1-butene, 1-hexene, 1-octene, 1-decene, 1-dodecene, 1-hexadecene, 1-tetradecene, and 1-octadecene, with 1-octene, 1-decene, 1-tetradecene, 1-dodecene and 1-octadecene being particularly preferred.

The 4-methyl-1-pentene polymer to be used herein preferably has a melt flow rate (MFR) falling within a range of 5 to 500 g/10 min. and preferably 25 to 150 g/10 min. under a load of 5 kg and at a temperature of 260° C.

COMPONENT B

The component B of the composition according to the present invention is a graft-modified polymer of 4-methyl-1-pentene. The backbone of the graft polymer is a polymer of 4-methyl-1-pentene, examples of which are described with regard to the component A. The grafts of the graft polymer (component B) are provided by an unsaturated carboxylic acid or an anhydride thereof.

Examples of the carboxylic acid and anhydride include an unsaturated monocarboxylic acid such as acrylic acid or methacrylic acid; an unsaturated dicarboxylic acid such as maleic acid, fumaric acid, itaconic acid, citraconic acid, allyl succinic acid, mesaconic acid, glutaconic acid, Nadic acid (Trademark: norbornene-2,3-dicarboxylic acid), methyl Nadic acid, tetrahydrophthalic acid, or methylhexahydrophthalic acid; an unsaturated dicarboxylic anhydride such as maleic anhydride, itaconic anhydride, citraconic anhydride, allyl succinic anhydride, glutaconic anhydride, Nadic anhydride (Trademark: norbornene-2,3-dicarboxylic anhydride), methyl Nadic anhydride, tetrahydrophthalic anhydride, or methyltetrahydrophthalic anhydride; or a mixture of 2 or more thereof. Of these unsaturated carboxylic acids and acid anhydrides thereof, maleic acid, maleic anhydride, Nadic acid, methyl Nadic acid, methyl Nadic anhydride, or Nadic anhydride is preferably used.

The amount of the grafts must fall within a range between 0.5% by weight and 15% by weight, inclusive, based on the total weight of the graft polymer. As may be seen from the Comparative Examples 1 and 2 (to be described later), when the degree of graft is smaller than 0.5% by weight, the polymer of 4-methyl-1-pentene is not sufficiently improved, and the thermal deformation temperature, tensile strength, flexural strength, and impact strength of the resultant composition are not satisfactorily improved. On the other hand, if the degree of graft exceeds 15% by weight, the water resistance of the resultant composition is impaired.

The graft-modified polymer to be used herein has a limiting viscosity $[\eta]$ falling within a range between 0.3 dl/g and 10 dl/g, inclusive. If a graft-modified polymer of 4-methyl-1-pentene having a limiting viscosity $[\eta]$ smaller than 0.3 dl/g is used satisfactory improvements in the thermal deformation temperature (heat resistance), tensile strength, flexural strength, impact strength and water resistance (water absorption) cannot be obtained. On the other hand, when a graft-modified polymer of 4-methyl-1-pentene having a limiting viscosity $[\eta]$ higher than 10 dl/g has too high a viscosity in a molten state, thereby providing only a poor wettability to glass fibers. Thus, again, overall satisfactory improvements in mechanical properties (tensile strength, flexural strength, and impact strength) and water resistance of the composition cannot be obtained.

The backbone polymer of 4-methyl-1-pentene polymer preferably has a limiting viscosity $[\eta]$ at 135° C. in a decalin solution falling within a range between 0.5 dl/g and 25 dl/g. When the backbone polymer having a limiting viscosity falling outside this range is used, a desired graft polymer having a limiting viscosity falling within a range between 0.3 dl/g and 10 dl/g is difficult to obtain.

The graft-modified polymer of 4-methyl-1-pentene (component B) can be obtained as follows. A 4-methyl-1-pentene polymer (backbone polymer) is added to a solvent, and dissolved by heating. The unsaturated carboxylic acid or anhydride thereof and a free-radical initiator are added to the solution. The free-radical initiator is used in an amount falling within a range between 0.1 part by weight and 100 parts by weight, and preferably between 0.5 part by weight and 50 parts by weight, with respect to 100 parts by weight of the 4-methyl-1-pentene polymer. The solvent is used in an amount falling within a range between 100 parts by weight and 100,000 parts by weight, and preferably within a range between 200 parts by weight and 10,000 parts by weight, with respect to 100 parts by weight of the 4-methyl-1-pentene polymer. The graft modification reaction is generally performed at a temperature of 100 to 250° C., and preferably 110° to 200° C., for a time duration of 15 to 1200 minutes, and preferably 30 to 600 minutes. Examples of the solvent used for the modification reaction include an aliphatic hydrocarbon such as hexane, heptane, octane, decane, dodecane, tetradecane, or kerosene; an alicyclic hydrocarbon such as methyldicyclopentane, cyclohexane, methylcyclohexane, cyclooctane, or cyclododecane; an aromatic hydrocarbon such as benzene, toluene, xylene, ethylbenzene, cumene, ethyltoluene, trimethylbenzene, cymene, or diisopropylbenzene; or a halogenic hydrocarbon such as chlorobenzene, bromobenzene, o-dichlorobenzene, carbon tetrachloride, trichloroethane, trichloroethylene, tetrachloroethane, or tetrachloroethylene. Of these, an aromatic hydrocarbon is preferably used.

An organic peroxide is preferably used as the free-radical initiator in the graft modification reaction as described above. More specifically, preferred examples of an organic peroxide include an alkyl peroxide, an aryl peroxide, an acyl peroxide, an aroyl peroxide, a ketone peroxide, a peroxycarbonate, a peroxycarboxylate, a hydroperoxide, and so on. Examples of an alkyl peroxide include diisopropyl peroxide, di-tert-butyl peroxide, and 2,5-dimethyl-2,5-di-tert-butylperoxyhexyne-3,2,5-dimethyl-2,5-di-tert-butylperoxyhexane. An example of an aryl peroxide is dicumyl peroxide. An example of an acyl peroxide is dilauroyl peroxide. An example of an aroyl peroxide is dibenzoyl peroxide. Examples of a ketone peroxide include methyl ethyl ketone peroxide, and cyclohexanone peroxide. Examples of a hydroperoxide include tert-butyl hydroperoxide and cumene hydroperoxide. Of these, preferred examples of a free-radical initiator are di-tert-butyl peroxide, 2,5-dimethyl-2,5-di-tert-butylperoxy-hexyne-3,2,5-dimethyl-2,5-di-tert-butylperoxyhexane, dicumyl peroxide and dibenzoyl peroxide.

The unsaturated carboxylic acid or the acid anhydride thereof is used in the graft reaction in the amount falling within a range between 1 part by weight and 500 parts by weight and preferably between 2 parts by weight and 100 parts by weight with respect to 100 parts by weight of the 4-methyl-1-pentene polymer. When the amount of the unsaturated carboxylic acid or acid anhydride thereof is less than 1 part by weight, the amount of the unsaturated carboxylic acid or acid anhydride thereof grafted in the resultant graft-modified polymer becomes less than 0.5% by weight. On the other hand, when the amount of the unsaturated carboxylic acid or acid anhydride thereof exceeds 500 parts by weight, the amount of the unsaturated carboxylic acid or acid anhydride thereof grafted in the resultant graft-modified polymer becomes more than 15% by weight.

The graft-modified polymer to be used herein is preferably prepared by the solution method as described above. In a method utilizing an extruder, i.e., a method wherein a 4-methyl-1-pentene polymer, an unsaturated carboxylic acid or an acid anhydride thereof, and a free-radical initiator are mixed and melted and kneaded by an extruder, the 4-methyl-1-pentene polymer undergoes thermal decomposition. For this reason, the resultant polymer cannot have a required limiting viscosity $[\eta]$ (within a range between 0.3 dl/g and 10 dl/g, inclusive) or a predetermined amount of graft (within a range between 0.5% by weight and 15% by weight, inclusive).

A 4-methyl-1-pentene polymer composition having particularly good heat resistance and mechanical strength can be prepared if a graft-modified polymer of 4-methyl-1-pentene having the following characteristics is used: a molecular-weight distribution $\overline{M}w/\overline{M}n$ of 1 to 8, a melting point (M.P.) of 170° to 245° C., a crystallinity of 1 to 45%, and/or a DSC parameter of 4.0 or less.

The molecular-weight distribution $\overline{M}w/\overline{M}n$ is a ratio of the weight-average molecular weight $\overline{M}w$ to the number-average molecular weight $\overline{M}n$. The molecular-weight distribution $\overline{M}w/\overline{M}n$ is measured by gel permeation chromatography (GPC) in accordance with the following procedures. As a solvent o-dichlorobenzene is used. 0.04 g of the polymer is added to 100 parts by weight of the solvent (0.05 parts by weight of 2,6-di-tert-butyl-p-cresol (stabilizer) is added to 100 parts by weight of the polymer). The resultant solution is filtered through a 1-$\mu$ mesh filter to remove impurities such as dust. A GPC measurement apparatus is set at a column temperature of 135° C. and the solution is poured into the apparatus at a flow rate of 1.0 ml/min for measurement. The $\overline{M}w/\overline{M}n$ ratio is calculated based on a value obtained for polystyrene.

The melting point is measured with a differential scanning calorimeter (DSC), du Pout 990 type, in accordance with the following procedures. A sample polymer is placed in the DSC, and the temperature is raised from room temperature to 270° C. at a rate of 20° C./min. After a temperature of 270° C. is reached, the temperature is decreased to 25° C. at a rate of 20° C./min. The melting point is read as the temperature at which the peak of the melting curve appears. When more than one peak readings appears, the highest reading is adopted.

The crystallinity is measured in accordance with the following procedures. Referring to a chart of measurements of melting point by a DSC as described above, a melting area S per unit weight of the sample, the area S being within the limit defined by melting curve, is compared with a melting area So on a recording paper which corresponds to a melting energy Po per unit weight of indium as a standard sample. Since the value of Po of indium is known and the melting energy P per unit weight of the crystalline portion of the 4-methyl-1-pentene polymer is given as below, the crystallinity of the sample can be calculated in accordance with the following equation:

Crystallinity (%) = (S/So) × (Po/P) × 100 where Po is 27 Joul/g (at 156±0.5° C.) and P is 141.7 Joul/g (F.C. Frank et al, Philosophical Magazine, 4, 200 (1959)).

The DSC parameter represents the composition distribution of the graft-modified polymer of 4-methyl-1-pentene and is measured in accordance with data obtained during measurement of the melting point using a DSC. More specifically, the DSC parameter is obtained by dividing the area S of the sample by the peak amplitude at the melting point (maximum peak) described above. It is thus expected that the smaller the DSC parameter, the narrower the composition distribution of the graft-modified polymer.

COMPONENT C

The glass fibers to be used in the invention need not be surface-treated. However, if surface-treated glass fibers are used, they are chemically bonded to the 4-methyl-1-pentene polymer to improve the mechanical strength and the thermal decomposition temperature of the composition more effectively. The surface-treating agent to be used is preferably a silane compound having an amino group such as γ-aminopropyltrimethoxysilane, γ-aminopropyltriethoxysilane, N-(β-aminoethyl)-γ-aminopropyltriethoxysilane, or the like, which easily reacts with an unsaturated carboxylic acid or an acid anhydride thereof.

The glass fibers to be used herein preferably have a size of about 1 to 30 μm of diameter, and about 0.1 mm to 50 mm of length.

Further, it is possible to use glass cloths, glass mats and the like.

COMPONENT RATIO

The glass-reinforced composition of the present invention contains 80 to 99.99 parts by weight, and preferably 90 to 99.9 parts by weight of the 4-methyl-1-pentene polymer (component A).

The graft-modified polymer of 4-methyl-1-pentene (component B) is used in an amount of 0.01 to 20 parts by weight and preferably 0.1 to 10 parts by weights. As will be seen from Comparative Examples 1 and 2 (to be described later), when the amount of the graft-modified polymer is smaller than 0.01 parts by weight, the effect of addition thereof is slight. Thus, the overall mechanical strength, heat distortion temperature and water resistance of the resultant composition are not satisfactorily improved. On the other hand, when the amount of the graft-modified polymer exceeds 20 parts by weight, the mechanical strength, that is, flexural strength, tensile strength and impact strength, of the resultant composition are not satisfactorily improved.

The amount of glass fibers (component C) must fall within a range between 1 part by weight and 300 parts by weight, inclusive, with respect to 100 parts by weight of the sum of the components A and B. When the amount of glass fibers is smaller than 1 part by weight, overall satisfactory improvements in mechanical strength, thermal deformation temperature and water resistance of the resultant composition cannot be obtained. On the other hand, when the amount of glass fibers exceeds 300 parts by weight, upon molding of the resultant composition, the glass fibers are exposed to the surface of the molded product, thus significantly impairing the external appearance of the molded material and the value of the molded material as a final product.

The glass-reinforced polymer composition of the invention can be prepared by mixing the components A, B and C together in amounts noted above. The mixing can be performed by a conventional mixing method such as a method utilizing a Henschel mixer, a V-blender, a ribbon blender or a tumbler blender; or a method of mixing with such a mixer or blender and of melting and kneading with a uniaxial extruder, biaxial extruder or a kneader. A glass-reinforced polymer composition of the present invention can be granulated or molded by such an extruder.

When glass fibers in a cloth or mat form is used, they can be impregnated with a solution containing the components A and B. The resultant material is dried to provide the composition of the present invention.

The present invention will be described below by way of the following Examples.

Example I

A 4-methyl-1-pentene homopolymer (limiting viscosity [η]: 1.7 dl/g; molecular-weight distribution $\overline{M}w/\overline{M}n$: 7.5; M.P.: 241° C.; crystallinity: 42%; and DSC parameter: 3.0) was dissolved in toluene. Grafting with maleic anhydride was performed at 145° C. using dicumyl peroxide as a catalyst. After precipitating the polymer by adding a large excess amount of acetone, the precipitate was filtered. The precipitate was repeatedly washed with acetone to provide a maleic anhydride graft-modified 4-methyl-1-pentene polymer (Sample A). Table 1 below shows the various properties of the maleic anhydride graft-modified 4-methyl-1-pentene polymer.

Maleic anhydride graft-modified 4-methyl-1-pentene polymers (Samples B to E) having different amounts of graft were obtained by adjusting the amounts of dicumyl peroxide and maleic anhydride supplied in the preparation method as described for Sample A. Table 1 also shows the various properties of these Samples B to E.

COMPARATIVE EXAMPLE 1

A maleic anhydride graft-modified 4-methyl-1-pentene-decene-1 copolymer (Comparative Sample F) was prepared following the same procedures as in preparation of the grafted poly-4-methyl-1-pentene of Example I above except that a 4-methyl-1-pentenedecene-1 copolymer (decene-1 content: 3% by weight; limiting viscosity [η]: 6.0 dl/g; molecular-weight distribution $\overline{M}w/\overline{M}n$: 7.5; M.P.: 236° C.; and DSC parameter: 3.2) was used in place of the homopolymer used in Example I. Table 1 also shows the various properties of Comparative Sample F.

COMPARATIVE EXAMPLE 2

A Nadic anhydride graft-modified 4-methyl-1-pentene polymer (Comparative Sample G) was prepared following the same procedures of Example I except that a Nadic anhydride was used in place of maleic anhydride as a modifing monomer. Table 1 shows the various properties of Comparative Sample G.

COMPARATIVE EXAMPLE 3

Maleic anhydride and 2,5-dimethyl-2,5-di-tert-butyl-peroxy-hexyne-3 were added to a 4-methyl-1-pentene homopolymer (limiting viscosity [η]: 3.8 dl/g; molecular-weight distribution $\overline{M}w/\overline{M}n$: 7.3; M.P.: 240° C.; crystallinity: 41%; and DSC parameter: 3.2). The resultant mixture was fed to a uniaxial extruder set in $N_2$ atmosphere at 260° C. and was melted and kneaded. A maleic anhydride graft modified 4-methyl-1-pentene polymer H (Comparative Sample H) was thus prepared. Table 1 also shows the various properties of Comparative Sample H.

TABLE 1

| Characteristic | Sample A | Sample B | Sample C | Sample D | Sample E | Comparative sample F | Comparative sample G | Comparative sample H |
|---|---|---|---|---|---|---|---|---|
| Modifier | MAH | MAH | MAH | MAH | HAH | MAH | MAH | MAH |
| Amount of graft (wt %) | 4.3 | 1.2 | 5.4 | 4.0 | 3.2 | 0.4 | 16 | 1.4 |
| Limiting viscosity (dl/g) | 0.86 | 0.95 | 0.80 | 1.32 | 0.99 | 1.32 | 0.52 | 0.15 |
| Melting point (°C.) | 208 | 217 | 205 | 235 | 209 | 235 | 183 | 212 |
| Molecular weight determination | 4.5 | 4.0 | 5.0 | 7.0 | 4.5 | 7.0 | 6.8 | 5.2 |
| Crystallinity (%) | 16 | 30 | 16 | 35 | 16 | 35 | 8 | 24 |
| DSC parameter | 2.8 | 3.4 | 2.5 | 3.2 | 3.0 | 3.2 | 2.0 | 4.3 |

MAH: maleic anhydride
HAH: Nadic anhydride

Among the 4-methyl-1-pentene graft-modified polymer samples A to H obtained in Example I and Comparative Examples I to III above, Comparative Samples F, G and H were prepared for the purpose of comparison with samples of the Examples of the present invention. Accordingly, Comparative Samples F, G and H do not have the properties as specified in the present invention. Thus, Comparative Sample F has an amount of graft of carboxylic anhydride of 0.4% by weight which does not fall within the range (range between 0.5% by weight and 15% by weight, inclusive) in accordance with the present invention. Comparative Sample G has an amount of graft of carboxylic anhydride of 16% by weight which similarly falls outside the range in accordance with the present invention. Comparative Sample H has a limiting viscosity [η] of 0.15 which falls outside the range (range between 0.3 dl/g and 10 dl/g, inclusive) in accordance with the present invention.

EXAMPLES 1-5

Ninety-nine parts by weight of the 4-methyl-1-pentene homopolymer used in the preparation of the Samples and Comparative Samples described above, 11 parts by weight of glass fibers, and 1 part by weight of the graft-modified polymer sample A were mixed and the resultant mixture was formed into pellets (Example 1) with an extruder. A sample was prepared from the pellets by an injection molder and was subjected to a flexural strength test, a tensile strength test, an IZOT impact strength test, a thermal deformation test, and a boiling water resistance (water absorption) test. The obtained results are shown in Table 2 below.

Similar pellets (Example 2) were prepared using Sample B in place of Sample A in the same proportions as in Example 1. A sample obtained from the pellets was subjected to the same tests as in Example 1, and the obtained results are also shown in Table 2.

Similarly, the same tests were performed for pellets (Example 3) obtained using Sample C, pellets (Example 4) obtained using Sample D, pellets (Example 5) obtained using Sample E, pellets (Comparative Example 1) obtained using Comparative Sample F, pellets (Comparative Example 2) obtained using Comparative Sample G, and pellets (Comparative Example 3) obtained using Comparative Sample H. The obtained results are shown in Table 2.

TABLE 2

|  | Example 1 | Example 2 | Example 3 | Example 4 | Example 5 | Comparative example 1 | Comparative example 2 | Comparative example 3 |
|---|---|---|---|---|---|---|---|---|
| Sample (parts by weight) | A<br>1 | B<br>1 | C<br>1 | D<br>1 | E<br>1 | F<br>1 | G<br>1 | H<br>1 |
| Poly-4-methyl-1-pentenen (parts by weight) | 99 | 99 | 99 | 99 | 99 | 99 | 99 | 99 |
| Glass fiber (parts by weight) | 11 | 11 | 11 | 11 | 11 | 11 | 11 | 11 |
| Flexural strength (kg/cm$^2$) | 810 | 710 | 770 | 790 | 800 | 690 | 700 | 660 |
| Tensile strength (kg/cm$^2$) | 480 | 440 | 460 | 450 | 490 | 430 | 440 | 440 |
| IZOD impact strength (kg-cm/cm) | 8.2 | 8.7 | 9.2 | 10.0 | 8.5 | 9.5 | 7.5 | 5.5 |
| H.D.T. (°C.) | >200 | 140 | >200 | >200 | >200 | 95 | 180 | 116 |
| Water absorption (wt %) | 0.1 | <0.1 | 0.1 | 0.1 | 0.1 | <0.1 | 0.5 | <0.1 |

H.D.T.: Heat distortion temperature, 264 psi
Water absorption: wt % after 30 days, 100° C.

As may be seen from Table 2, the samples of Examples 1 to 5 of the present invention provide the higher overall standards of various properties, i.e., flexural strength, tensile strength, IZOD impact strength, heat distortion temperature (heat resistance), and water absorption than those of Comparative Examples 1 to 3. The samples of Examples exhibit particularly good heat resistance as compared to that of samples of Comparative Examples. The glass-reinforced polymer compositions (Examples 1 to 5) according to the present invention have higher overall standards of mechanical strength, heat resistance and water absorption as compared to samples of Comparative Examples.

EXAMPLES 6 TO 8

Pellets (Examples 6 to 8) were prepared by mixing Sample A, a 4-methyl-1-pentene polymer, and glass fibers in varying ratios. The pellets were subjected to the tests as in Examples 1 to 5 above and the obtained results are shown in Table 3 below.

COMPARATIVE EXAMPLES 4 AND 5

Pellets (Comparative Examples 4 and 5) were prepared by mixing a 4-methyl-1-pentene polymer and glass fibers alone without using a 4-methyl-1-pentene graft-modified polymer of 4-methyl-1-pentene. The resultant pellets subjected to the same tests as in Examples and the obtained results are also shown in Table 3.

TABLE 3

|  | Example 6 | Example 7 | Example 8 | Comparative example 4 | Comparative example 5 |
|---|---|---|---|---|---|
| Sample (parts by weight) | A<br>0.7 | A<br>1.4 | A<br>4.3 | — | — |
| Poly-4-methyl-1-pentene (parts by weight) | 99.3 | 98.6 | 95.7 | 100 | 100 |
| Glass fiber (parts by weight) | 42.9 | 42.9 | 42.9 | 42.9 | 11 |
| Flexural strength (kg/cm$^2$) | 840 | 1000 | 1120 | 780 | 650 |
| Tensile strength (kg/cm$^2$) | 550 | 610 | 700 | 450 | 400 |
| IZOD impact strength (kg-cm/cm) | 7.1 | 8.3 | 8.7 | 9.1 | 10.5 |
| H.D.T. (°C.) | >200 | >200 | >200 | >100 | 79 |
| Water absorption (wt %) | <0.1 | <0.1 | <0.1 | <0.1 | <0.1 |

H.D.T.: Heat distortion temperature, 264 psi

As may be seen from Table 3, samples of Examples 6 to 8 containing the graft-modified polymer of 4-methyl-1-pentene in amounts falling within the range between 0.5% by weight and 4.3% by weight, inclusive, exhibited higher standards of flexural strength, tensile strength, and heat resistance than those of the samples of Comparative Examples 4 and 5 which contained no graft-modified polymer of 4-methyl-1-pentene. Although the samples of Examples 6 to 8 have slightly lower standards of IZOD impact than those of Comparative Examples 4 and 5, the samples of Examples 6 to 8 show good overall standards of various other properties. Examples 6 to 8 exhibit particularly good standards of heat resistance. In summary, the glass-reinforced polymer compositions (Examples 6 to 8) show higher overall standards of mechanical strength, heat resistance and water absorption as compared to Comparative Examples. The Examples 6 to 8 show particularly good heat resistance.

As may be seen from Example 1 to 8, the compositions of the present invention have high overall standards of flexural strength, tensile strength, impact strength, heat resistance and water absorption. The present invention thus provides a glass-reinforced polymer composition which may be adopted in a variety of applications.

What is claimed is:

1. A glass-reinforced polymer composition comprising:
   80 to 99.99 parts by weight of a 4-methyl-1-pentene polymer;
   0.01 to 20 parts by weight of a graft-modified polymer of 4-methyl-1-pentene having grafted units of an unsaturated carboxylic acid or an acid anhydride thereof in amount of from 0.5% by weight to 15% by weight and a limiting viscosity[n] at 135° C. in decalin falling within a range between 0.3 dl/g and 10 dl/g, inclusive; and
   1 to 300 parts by weight of glass fibers with respect to 100 parts by weight of a sum of the 4-methyl-1-pentene polymer and the graft-modified polymer.

2. A composition according to claim 1, wherein the unsaturated carboxylic acid or the acid anhydride thereof is an unsaturated dicarboxylic anhydride.

3. A composition according to claim 2, wherein the unsaturated dicarboxylic anhydride is maleic anhydride.

4. A composition according to claim 2, wherein the unsaturated dicarboxylic anhydride is norbornene-2,3-dicarboxylic anhydride or methyl norbornene-2,3-dicarboxylic anhydride.

5. A composition according to claim 1, wherein the 4-methyl-1-pentene polymer is a 4-methyl-1-pentene homopolymer.

6. A composition according to claim 1, wherein the 4-methyl-1-pentene polymer is a copolymer of 4-methyl-1-pentene with an α-olefin.

7. A composition according to claim 6, wherein the α-olefin has 2 to 20 carbon atoms.

8. A composition according to claim 7, wherein the α-olefin is at least one member selected from the group consisting of ethylene, propylene, 1-butene, 1-hexene, 1-octene, 1-decene, 1-dodecene, 1-tetradecene, 1-hexadecene and 1-octadecene.

9. A composition according to claim 8, wherein the α-olefin is at least one member selected from the consisting of 1-octcne, 1-decene, 1-dodecene, 1-tetradecene, 1-hexadecene, and 1-octadecene.

10. A composition according to claim 1, wherein the 4-methyl-1-pentene polymer is used in an amount falling within a range between 90 parts by weight and 99.9 parts by weight, inclusive.

11. A composition according to claim 1, wherein the graft-modified polymer is used in an amount falling within a range between 0.1 parts by weight and 10 parts by weight, inclusive.

12. A composition according to claim 1, wherein the glass fibers is used in an amount falling within a range between 10 parts by weight and 100 parts by weight, inclusive, with respect to the sum in parts by weight of the 4-methyl-1-pentene polymer and the 4-methyl-1-pentene graft modified polymer.

13. A composition according to claim 1, wherein the glass fibers are surface-treated with an aminosilane compound.

14. A composition according to claim 13, wherein the aminosilane compound is at least one member selected from the group consisting of γ-aminopropyltrimethoxysilane, γ-aminopropyltriethoxysilane, and N-(β-aminoethyl)-γ-aminopropyltrimethoxysilane.

15. A composition according to claim 1, wherein the graft-modified polymer has a molecular-weight distribution ($\overline{M}w/\overline{M}n$) of 1 to 8.

16. A composition according to claim 1, wherein the graft-modified polymer has a melting point falling within a range between 170° C. and 245° C., inclusive.

17. A composition according to claim 1, wherein the graft-modified polymer has a crystallinity falling within a range between 1% and 45%, inclusive.

18. A composition according to claim 1, wherein the graft-modified polymer has a differential scanning calorimeter parameter of not less than 4.0.

* * * * *